United States Patent
Lee et al.

(10) Patent No.: US 10,606,602 B2
(45) Date of Patent: Mar. 31, 2020

(54) ELECTRONIC APPARATUS, PROCESSOR AND CONTROL METHOD INCLUDING A COMPILER SCHEDULING INSTRUCTIONS TO REDUCE UNUSED INPUT PORTS

(71) Applicant: Samsung Electronics Co., Ltd., Gyeonggi-do (KR)

(72) Inventors: Yeon-bok Lee, Seoul (KR); Myung-sun Kim, Gyeonggi-do (KR); Shin-gyu Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 143 days.

(21) Appl. No.: 15/655,466

(22) Filed: Jul. 20, 2017

(65) Prior Publication Data
US 2018/0088954 A1    Mar. 29, 2018

(30) Foreign Application Priority Data

Sep. 26, 2016  (KR) .................. 10-2016-0123375

(51) Int. Cl.
*G06F 9/38*    (2018.01)
*G06F 8/41*    (2018.01)
*G06F 9/30*    (2018.01)

(52) U.S. Cl.
CPC .......... *G06F 9/3836* (2013.01); *G06F 8/4451* (2013.01); *G06F 9/3001* (2013.01); *G06F 9/3017* (2013.01); *G06F 9/3885* (2013.01)

(58) Field of Classification Search
CPC .... G06F 9/3836; G06F 8/4451; G06F 9/3017; G06F 9/3001; G06F 8/445; G06F 9/3885;
(Continued)

(56) References Cited

U.S. PATENT DOCUMENTS 6,076,154 A * 6/2000 Van Eijndhoven .......... G06F 9/30149
  712/206
7,315,935 B1 * 1/2008 Alsup ................. G06F 9/30141
  712/214

(Continued)

FOREIGN PATENT DOCUMENTS

JP    H 1185513    3/1999
JP    2005129087   5/2005
(Continued)

OTHER PUBLICATIONS

International Search Report dated Dec. 19, 2017 issued in counterpart application No. PCT/KR2017/009799, 7 pages.
(Continued)

*Primary Examiner* — Aimee Li
*Assistant Examiner* — Shawn Doman
(74) *Attorney, Agent, or Firm* — The Farrell Law Firm, P.C.

(57) ABSTRACT

An electronic apparatus is provided for obtaining compiling data used in an external processor including a function unit including a plurality of input ports. The electronic apparatus includes a storage configured to store a plurality of instructions, and a processor configured to schedule each of the plurality of instructions in a plurality of cycles, assign a plurality of input data corresponding to the plurality of instructions to the plurality of input ports in a corresponding cycle, and if an unassigned input port among the plurality of input ports is present in a first cycle, assign a part of input data corresponding to an instruction scheduled in a second cycle after the first cycle to the unassigned input port in the first cycle, and obtain the compiling data by assigning remaining data of the input data corresponding the instruction to one of the plurality of input ports in the second cycle.

16 Claims, 15 Drawing Sheets

(58) Field of Classification Search
CPC ...... G06F 9/3824; G06F 8/443; G06F 8/4434; G06F 8/4441; G06F 8/456
USPC .................. 712/215, 216; 717/151, 153, 159
See application file for complete search history.

(56) References Cited

U.S. PATENT DOCUMENTS

| | | | |
|---|---|---|---|
| 7,478,225 B1* | 1/2009 | Brooks | G06F 9/3836 712/214 |
| 7,802,076 B2 | 9/2010 | Almog et al. | |
| 7,941,635 B2 | 5/2011 | Nguyen et al. | |
| 8,095,780 B2* | 1/2012 | Leijten | G06F 9/3836 712/215 |
| 8,108,656 B2* | 1/2012 | Katragadda | G06F 9/5044 709/205 |
| 8,479,179 B2 | 7/2013 | Wu et al. | |
| 9,747,224 B2* | 8/2017 | Jin | G06F 13/102 |
| 2004/0193846 A1* | 9/2004 | Sprangle | G06F 9/30141 712/218 |
| 2005/0182916 A1 | 8/2005 | Kageyama et al. | |
| 2005/0216899 A1 | 9/2005 | Muthukumar et al. | |
| 2006/0248320 A1* | 11/2006 | Chin | G06F 9/3836 712/241 |
| 2007/0192547 A1* | 8/2007 | Feghali | G06F 9/3001 711/154 |
| 2009/0119490 A1 | 5/2009 | Oh et al. | |
| 2009/0282223 A1 | 11/2009 | Lyuh et al. | |
| 2010/0005456 A1* | 1/2010 | Wu | G06F 8/452 717/141 |
| 2010/0049946 A1 | 2/2010 | Myouga et al. | |
| 2011/0072243 A1 | 3/2011 | Qiu et al. | |
| 2011/0225399 A1 | 9/2011 | Jin et al. | |
| 2013/0086357 A1* | 4/2013 | Rupley | G06F 9/30098 712/32 |
| 2013/0232317 A1* | 9/2013 | Yasuda | G06F 15/8053 712/2 |
| 2013/0318324 A1 | 11/2013 | Suh | |
| 2013/0339689 A1* | 12/2013 | Srinivasan | G06F 9/3867 712/233 |
| 2014/0215476 A1 | 7/2014 | Park et al. | |
| 2015/0149747 A1 | 5/2015 | Lee et al. | |
| 2015/0178132 A1* | 6/2015 | Cho | G06F 9/3851 718/101 |
| 2016/0098276 A1* | 4/2016 | Du | G06F 9/30141 712/217 |
| 2016/0110201 A1* | 4/2016 | Carlson | G06F 9/3826 712/215 |
| 2017/0024216 A1 | 1/2017 | Suh et al. | |

FOREIGN PATENT DOCUMENTS

| | | |
|---|---|---|
| JP | 2008523523 | 7/2008 |
| JP | 2015184979 | 10/2015 |
| JP | 5887811 | 3/2016 |
| WO | WO 2015/137722 | 9/2015 |

OTHER PUBLICATIONS

European Search Report dated Jun. 19, 2019 issued in counterpart application No. 17853328.7-1221, 16 pages.

European Search Report dated Oct. 30, 2019 issued in counterpart application No. 17853328.7-1221, 17 pages.

* cited by examiner

FIG. 4
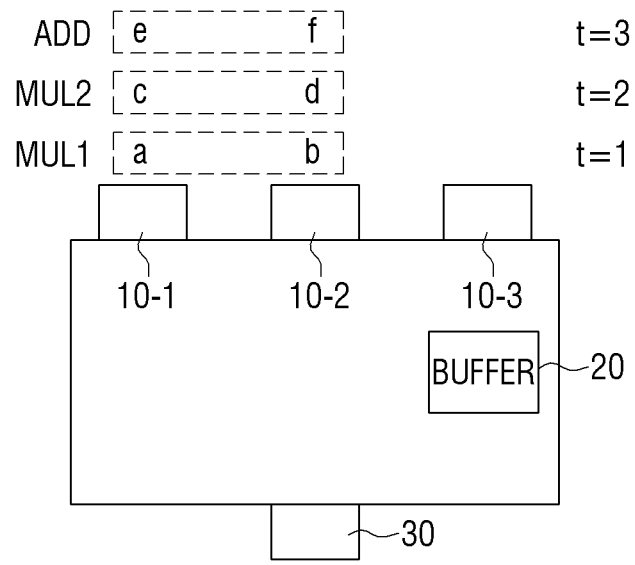
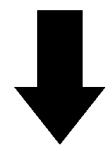
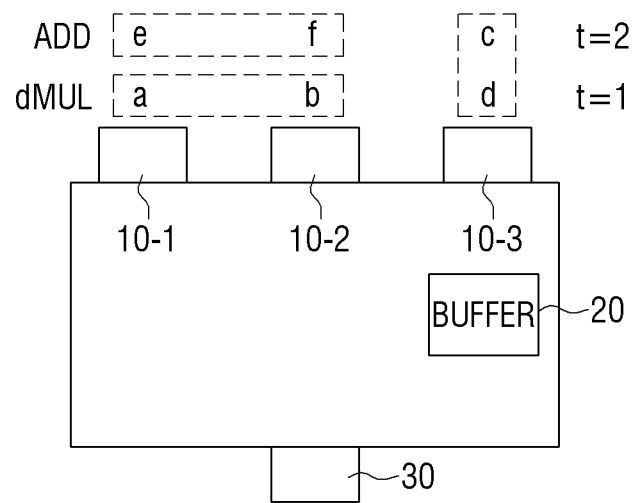

FIG. 5
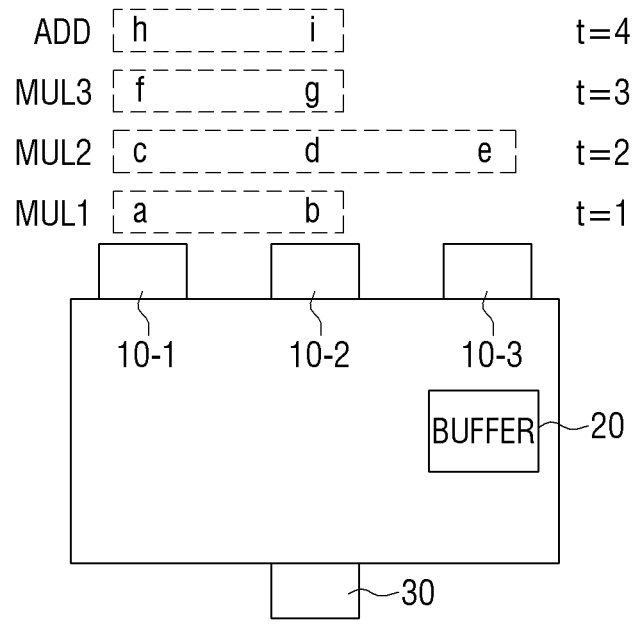
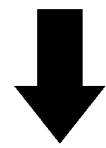
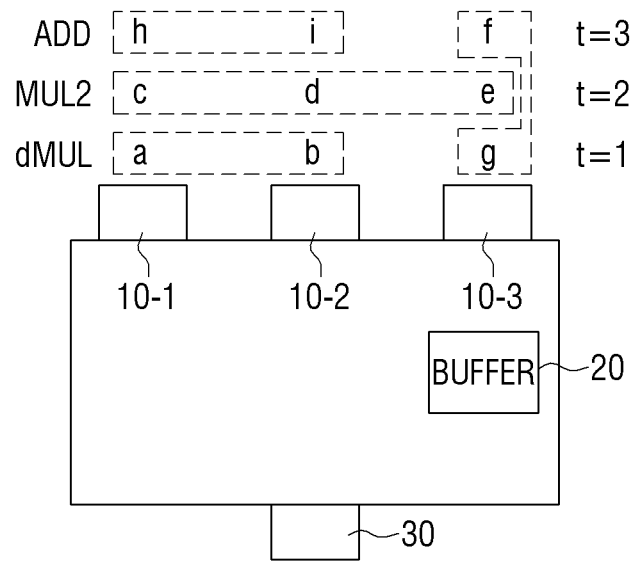

FIG. 6
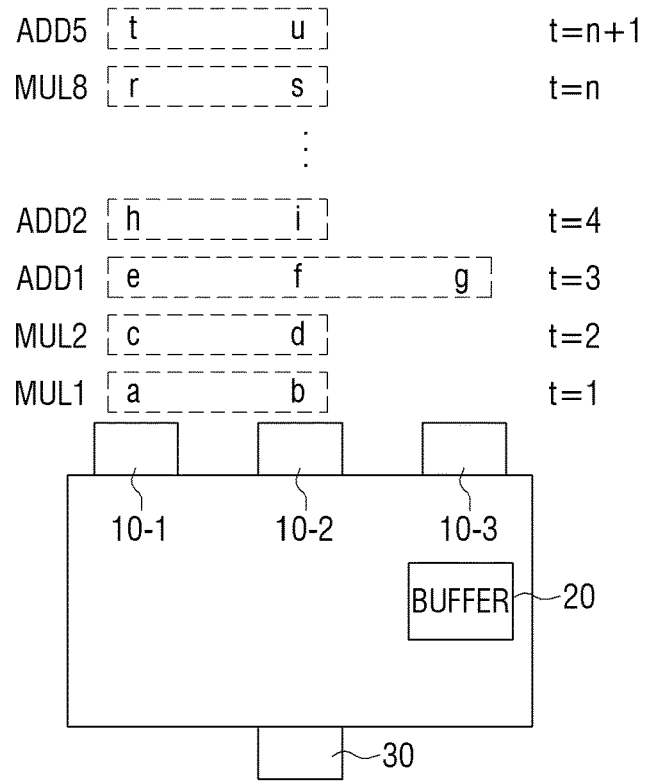
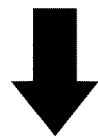
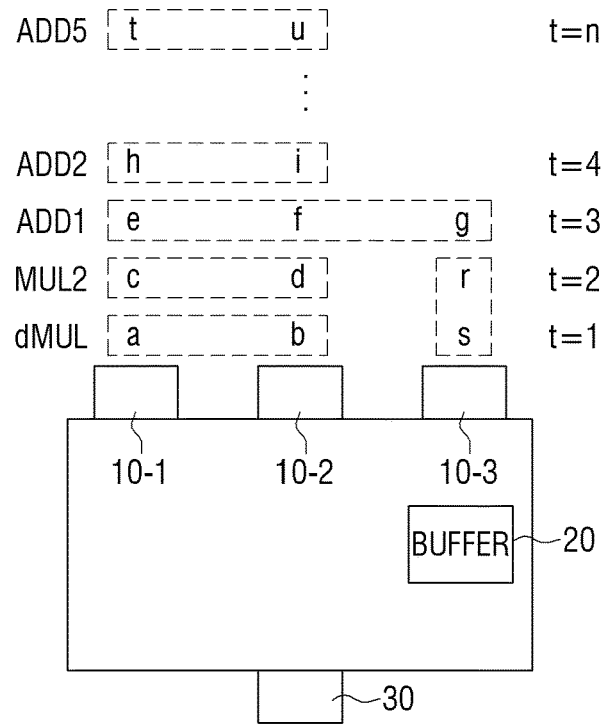

FIG. 7

| INSTRUCTION | INSTRUCTION | COMBINED INSTRUCTION |
|---|---|---|
| MUL | MUL | DMUL |
| MUL | ADD | MUL_ADD / ADD_MUL |
| ⋮ | ⋮ | ⋮ |

FIG. 9

| cycle | issue | ex1 | ex2 | ex3 | ex4 | wb |
|---|---|---|---|---|---|---|
| 1 | Mul | | | | | |
| 2 | Mul | Mul | | | | |
| 3 | Add | Mul | Mul | | | |
| 4 | | Add | Mul | Mul | | |
| 5 | | | | Mul | Mul | Add |
| 6 | Sub | | | | Mul | Mul |
| 7 | Mul | Sub | | | | Mul |
| 8 | Mul | Mul | | | | Sub |
| 9 | Add | Mul | Mul | | | |
| 10 | | Add | Mul | Mul | | |
| 11 | | | | Mul | Mul | Add |
| 12 | Sub | | | | Mul | Mul |
| 13 | | Sub | | | | Mul |
| 14 | | | | | | Sub |

| cycle | issue | ex1 | ex2 | ex3 | ex4 | wb |
|---|---|---|---|---|---|---|
| 1 | Dmul | | | | | |
| 2 | Add | Mul | | | | |
| 3 | Sub | Mul<br>Add | Mul | | | |
| 4 | Dmul | Sub | Mul | Mul | | Add |
| 5 | Add | Mul | | Mul | Mul | Sub |
| 6 | | Mul<br>Add | Mul | | Mul | Mul |
| 7 | | | Mul | Mul | | Mul |
| 8 | | | | Mul | Mul | Add |
| 9 | Sub | | | | Mul | Mul |
| 10 | | Sub | | | | Mul |
| 11 | | | | | | Sub |

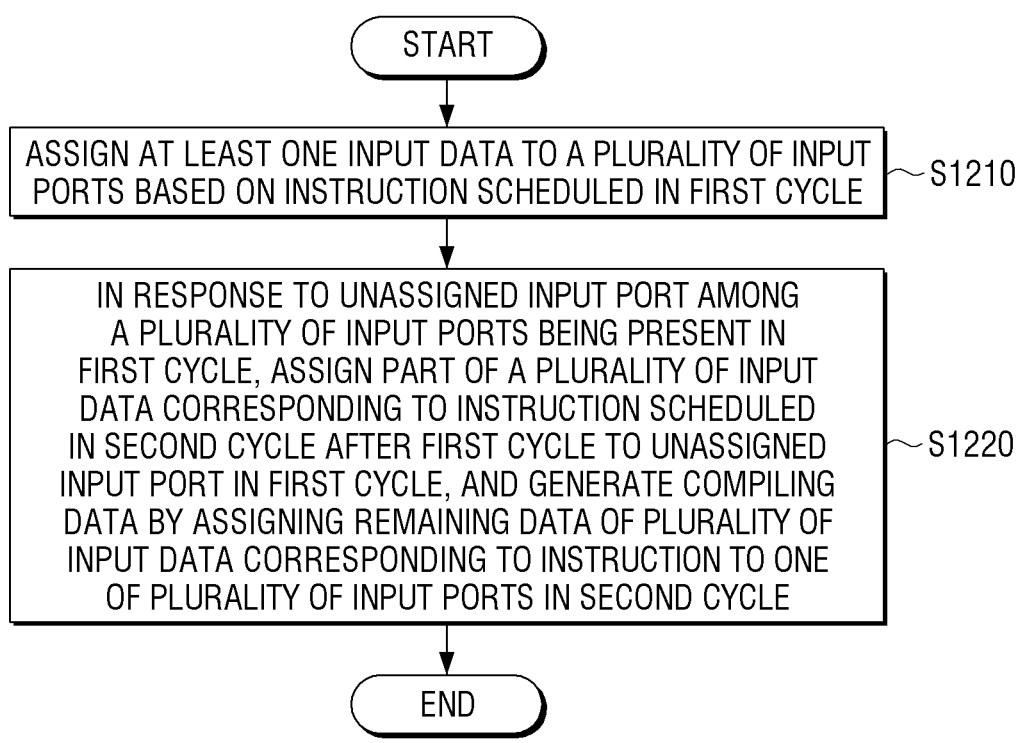

ELECTRONIC APPARATUS, PROCESSOR AND CONTROL METHOD INCLUDING A COMPILER SCHEDULING INSTRUCTIONS TO REDUCE UNUSED INPUT PORTS

PRIORITY

This application claims priority under 35 U.S.C. § 119 to Korean Patent Application No. 10-2016-0123375, which was filed in the Korean Intellectual Property Office on Sep. 26, 2016, the entire disclosure of which is incorporated herein by reference.

BACKGROUND

1. Field of the Disclosure

The present disclosure relates generally to an electronic apparatus, processor, and a control method thereof, and more particularly, to an electronic apparatus for scheduling and processing received instructions and data, a processor, and a control method thereof.

2. Description of the Related Art

Processors, such as very long instruction word (VLIW) and coarse-grained array (CGA) processors, schedule a plurality of instructions simultaneously to raise instruction level parallelism (ILP). In such a processor, each instruction is separated into pipeline stages, such as fetch, decode, execution, and write back, in a function unit (FU) that supports the instruction and is executed continuously.

A compiler checks dependencies and resources between instructions to perform scheduling. The compiler determines whether the input ports and output ports of an FU, such as an issue or a write back, are occupied per cycle. That is, the compiler checks for a port conflict and performs scheduling.

For example, if a multiplication instruction of latency 2 is input in a first cycle, output data is output in a third cycle. When an addition instruction of latency 1 is input in a second cycle, output data is output in the third cycle, and a collision occurs at the output port. Thus, an addition instruction cannot be issued in the second cycle. In this case, if there is no dependency between the multiplication instruction and the addition instruction, the addition instruction may be discussed first, but if the scheduling order is changed, the scheduling algorithm becomes complicated. Generally, the addition instruction is issued in the third cycle.

In particular, if instructions with long latency are issued consecutively, the probability of port conflict increases and the scheduling efficiency deteriorates. Accordingly, there is a need for improved scheduling efficiency, without causing port conflicts.

SUMMARY

The present disclosure is provided to address at least the problems and/or disadvantages described above and to provide at least the advantages described below.

An aspect of the present disclosure is to provide an electronic apparatus, a processor, and a control method for scheduling and processing an unallocated input port among a plurality of input ports provided in an FU.

Another aspect of the present disclosure is to provide an electronic apparatus, a processor, and a control method for scheduling an instruction to use an unassigned input port of an FU to improve scheduling efficiency and reduce a cord size.

In accordance with an aspect of the present disclosure, an electronic apparatus is provided for obtaining compiling data used in a processor including an FU including a plurality of input ports. The electronic apparatus includes a storage; and a processor configured to control the storage to store a plurality of instructions, schedule each of the plurality of instructions in a plurality of cycles, assign a plurality of input data corresponding to the plurality of instructions to the plurality of input ports in a corresponding cycle, and if an unassigned input port among the plurality of input ports is present in a first cycle, assign a part of input data corresponding to an instruction scheduled in a second cycle after the first cycle to the unassigned input port in the first cycle, and obtain the compiling data by assigning remaining data of the input data corresponding the instruction to one of the plurality of input ports in the second cycle.

In accordance with another aspect of the present disclosure, a processor is provided, which includes a memory configured to store input compiling data; and an FU, which includes a plurality of input ports and at least one buffer, configured to process the compiling data, wherein the processor, if a combined instruction included in the compiling data is processed in a first cycle, stores data input through at least one of the plurality of input ports in the at least one buffer, and calculates the stored data and data input through one of the plurality of input ports in a second cycle after the first cycle based on a corresponding instruction.

In accordance with another aspect of the present disclosure, a control method is provided for an electronic apparatus obtaining compiling data used in a processor including an FU including a plurality of input ports. The control method includes assigning input data to the plurality of input ports based on an instruction scheduled in a first cycle; and if an unassigned input port among the plurality of input ports is present in the first cycle, assigning a part of the input data corresponding to an instruction scheduled in a second cycle after the first cycle to the unassigned input port in the second cycle, and obtaining the compiling data by assigning remaining data of the input data corresponding to the instruction to one of the plurality of input ports.

In accordance with another aspect of the present disclosure, a control method is provided for a processor including an FU including a plurality of input ports and at least one buffer. The control method includes sequentially executing an instruction based on compiling data; in response to processing a combined instruction included in the compiling data in a first cycle, storing data input through at least one of a plurality of input ports in the at least one buffer; and calculating the stored data and data input through one of the plurality of input ports in a second cycle, after the first cycle, based on a corresponding instruction.

In accordance with another aspect of the present disclosure, a recording medium is provided for storing a program for performing an operation method of an electronic apparatus obtaining compiling data used in a processor including an FU including a plurality of input ports. The operation method includes assigning input data to the plurality of input ports based on an instruction scheduled in a first cycle; and if an unassigned input port among the plurality of input ports is present in the first cycle, assigning a part of the input data corresponding to an instruction scheduled in a second cycle after the first cycle to an unassigned input port in the first cycle, and obtaining the compiling data by assigning remaining data of the input data corresponding to the instruction to one of the plurality of input ports in the second cycle.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 4 illustrates a method for using an unassigned input port of an FU according to an embodiment of the present disclosure;

FIG. 5 illustrates a method for using an unassigned input port of an FU according to an embodiment of the present disclosure;

FIG. 6 illustrates a method for using an unassigned input port of an FU according to an embodiment of the present disclosure;

FIG. 7 illustrates a combined instruction according to an embodiment of the present disclosure;

FIG. 9 illustrates a combined instruction being used according to an embodiment of the present disclosure;

FIG. 12 is a flowchart illustrating a control method of an electronic apparatus according to an embodiment of the present disclosure.

DETAILED DESCRIPTION

Figure 1:
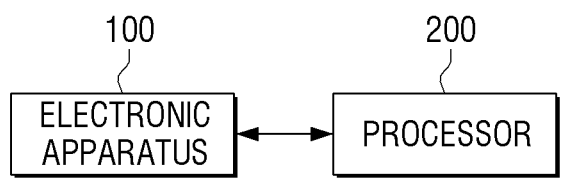
FIG. 1 illustrates an electronic apparatus and an external processor according to an embodiment of the present disclosure.

Various embodiments are illustrated in the drawings and are described in detail below. However, the present disclosure is not limited to these specific embodiments, and may include all modifications, equivalents, and substitutions, without departing from the scope and spirit of the present disclosure. In the drawings and description thereof, the same or similar drawing reference numerals may be used for similar constituent elements.

When an element (e.g., a first element) is referred to as being "(operatively or communicatively) coupled with/to" or "connected with" another element (e.g., a second element), the first element may be directly coupled with/to the second element, or there may be an intervening element (e.g., a third element) therebetween. However, when the first element is referred to as being "directly coupled with/to" or "directly connected to" the second element, there is no intervening element therebetween.

The terms used to describe the various embodiments of the present disclosure herein are not intended to limit the present disclosure. In addition, a singular expression does not limit the present disclosure to have a single component or step. Instead, the present disclosure may have multiple components or steps even if described in singular expression.

All of the terms used herein, including technical or scientific terms, have meanings as those generally understood by an ordinary skilled person in the related art, unless they are specifically defined otherwise. Terms defined in a standard dictionary should be interpreted as having the same meanings as the contextual meanings of the relevant technology and should not be interpreted as having ideal or exaggerated meanings unless they are clearly defined as such herein. According context, even terms defined herein should not be interpreted as excluding embodiments of the present disclosure.

FIG. 1 illustrates an electronic apparatus and an external processor according to an embodiment of the present disclosure.

Referring to FIG. 1, the electronic apparatus 100 may perform compiling. For example, the electronic apparatus 100 may convert a program written in a high-level language into a language that the external processor 200 can directly understand, so that the external processor 200 can process the program.

The electronic apparatus 100 may acquire a plurality of instructions from a program written in a high-level language, and generate compiling data by compiling the plurality of acquired instructions. The instructions may be processed in an FU included in the external processor 200.

The electronic apparatus 100 may detect an unassigned input port among a plurality of input ports of the FU while obtaining compiling data in order to generate compiling data so that the unassigned input port is used. The electronic apparatus 100 may generate compiling data using a combined instruction so that the unassigned input port is used.

The electronic apparatus 100 may also generate compiling data in a related-art technology or receive compiling data from an external device, and then update the compiling data so that the unassigned input port is used.

The electronic apparatus 100 may transmit the obtained compiling data to the processor 200. Alternatively, the compiling data may be indirectly transmitted to the external processor 200. The processor 200 may be provided in a device separate from the electronic apparatus 100.

For example, the electronic apparatus 100 may obtain compiling data and provide the obtained compiling data to a device including the external processor 200 for processing the compiling data. Hereinafter, for convenience, only the external processor 200 will be described, rather than the entire device including the external processor 200.

The external processor 200 may process compiled data received from the electronic apparatus 100. For example, an FU included in the external processor 200 may process an instruction per cycle based on the compiled data.

Hereinafter, for the convenience, it is assumed that the external processor 200 includes one FU. However, the present disclosure is also applicable to a processor including a plurality of FUs.

When the external processor 200 includes a plurality of FUs, the functionality of the FUs may vary. For example, a first FU within the external processor 200 may only be capable of an addition operation, while a second FU may be capable of a multiplication operation and an addition operation.

The external processor 200 may include information on a combined instruction in compiling data, and process the compiling data using at least one buffer provided in the FU. Through such operation, a processing speed of the external processor 200 may be enhanced.

Figure 2:
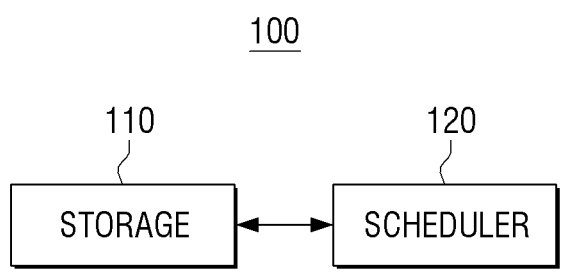
FIG. 2 illustrates an electronic apparatus according to an embodiment of the present disclosure.

FIG. 2 illustrates an electronic apparatus according to an embodiment of the present disclosure.

Referring to FIG. 2, the electronic apparatus 100 includes a storage 110 and a scheduler 120, e.g., a processor. The scheduler 120 may schedule an instruction based on whether an input port and output port of an FU included in a processor is occupied or not at each time. Hereinafter, the time will be referred to as a cycle.

The storage 110 may store a plurality of instructions. Alternatively, the storage 100 may store compiling data in which the plurality of instructions are compiled. The compiling data may be used in a processor including an FU, and may be output after being compiled by the scheduler 120. Alternatively, the compiling data may be received from a source external to the electronic apparatus 100.

The storage 110 may store information to combine a plurality of instructions into a single instruction. In addition, the storage 110 may store a method of scheduling by combining a plurality of instructions into a single instruction.

The scheduler 120 may schedule each of the plurality of instructions in a plurality of cycles. That is, the scheduler 120 may be a processor which performs the same function as the compiler. For example, the scheduler 120 may determine a cycle to perform an addition operation and a cycle to perform a multiplication operation when an addition operation and a multiplication operation are to be performed. The cycle may refer to a specific time.

Alternatively, when a processor is operated at a specific time, the processor may be operated at one time unit among a rising edge or a falling edge. For example, the scheduler 120 may perform scheduling to perform the multiplication operation at the rising edge of t=t0 and perform the addition operation at the next rising edge.

The scheduler 120 may schedule a plurality of instructions in consideration of at least one of a type of instruction, input data corresponding to the instruction, and an input port and output port of an FU included in the processor. In addition, the scheduler 120 may schedule the plurality of instructions to acquire output of the plurality of instructions at a minimum time. The detailed description thereof is well known in the art and thus will be omitted herein.

An FU may be a configuration for performing a predetermined operation within the external processor 200. For example, the FU may be a configuration for performing an addition operation within the external processor 200. However, an FU is not limited thereto, and the FU may perform another operation and an addition operations, i.e., may perform a plurality of operations.

The FU may include a plurality of input ports. The plurality of input ports receive input data corresponding to the instruction. For example, when performing the addition of 10 and 20, the input data 10 and 20 for performing the addition can be input through the plurality of input ports.

The number of the plurality of input ports may be determined based on a type of FU. For example, when many types of operations are provided by the FU, a larger number of input ports can be provided than when fewer types of operations are provided by the FU. For example, an FU capable of performing addition and multiplication may include more input ports than an FU only capable of an addition operation.

In addition, the number of plurality of input ports may be determined based on the amount of data to be input to the FU. For example, an FU that performs addition of 10 and 20 may include at least two input ports, whereas an FU that performs addition of 10, 20, and 30 may include at least three input ports.

An FU may include an output port, which is a configuration for outputting a result calculated by the FU.

The scheduler 120 may assign a plurality of input data corresponding to each of the plurality of instructions to a plurality of input ports in a corresponding cycle. For example, the scheduler 120, when performing the addition of 10 and 20, may schedule to input 10 to the input port 1 of the first cycle and input 20 to the input port 2 of the first cycle. In addition, the scheduler 120, when performing the multiplication of 30 and 40, may schedule to input 30 to the input port 1 of the second cycle and input 40 to the input port 2 of the second cycle.

That is, the scheduler 120 may assign the input data per cycle to the plurality of input ports, and schedule to calculate the instruction corresponding to the data input per cycle in the corresponding cycle. For example, the scheduler 120 may schedule the addition operation in the first cycle and the multiplication operation in the second cycle.

The scheduler 120 may, when an unassigned input port among a plurality of input ports is present in the first cycle, assign a part of a plurality of input data corresponding to an instruction scheduled in the second cycle after the first cycle, and assign the remaining parts of the plurality of input data corresponding to the instruction to one of the plurality of input ports in the second cycle.

For example, when scheduler 120 schedules to input 10 to the input port 1 of the first cycle and input 20 to the input port 2 of the first cycle to perform the addition of 10 and 20, and schedules to input 30 to the input port 1 of the second cycle and input 40 to the input port 2 of the second cycle to perform the multiplication of 30 and 40, when the FU includes three input ports, the input port 3 of the first cycle may be an unassigned input port. The scheduler 120 may assign 30 among the input data of the multiplication instruction scheduled in the second cycle to the input port 3 of the first cycle, and assign 40 among the input data of the multiplication instruction to one of the input ports 1, 2, and 3 in the second cycle.

Through the scheduling of the scheduler 120 as described above, two input ports may be in an unassigned state in the second cycle, where the scheduler 120 may assign a new instruction using two input data to the unassigned input port of the second cycle. That is, the scheduler 120 may generate compiling data to process three instructions during the same two cycles through scheduling as described above, during which the two instructions were processed during the first cycle and the second cycle.

The output port outputs a result of performing calculation based on the instruction. The FU may include one output port. However, the example is not limited thereto, and the FU may include a plurality of output ports as well. The number of output ports may be smaller than the number of input ports.

The output port may output one output data during one cycle. The scheduler 120 may schedule a plurality of instructions not to output a plurality of output data calculated from the data input through a plurality of input ports during one cycle. The scheduler 120 may schedule a plurality of instructions in consideration of the latency of each instruction. The latency may be the time from when the input data is input and calculated, until the output to the output data.

As described above, the external processor 200 may process more instructions during the same cycle.

Figure 3:
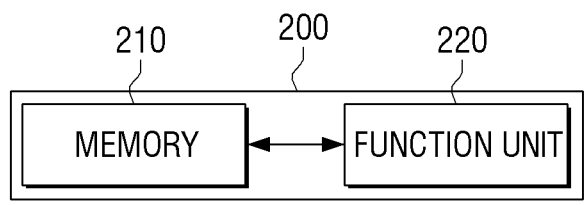
FIG. 3 illustrates a processor according to an embodiment of the present disclosure.

FIG. 3 illustrates a processor according to an embodiment of the present disclosure. For example, the external processor 200 may be a sub-processor for performing a predetermined operation.

Referring to FIG. 3, the external processor 200 includes a memory 210 and an FU 220.

The memory 210 may store compiling data, which may be directly input from an electronic apparatus, or may be input via another device. For example, the compiling data may be input through a memory provided in a source provided external to the external processor 200.

The compiling data may be compiled so that the number of unassigned input ports among a plurality of input ports of the FU is minimized.

The memory 210 may be one of a cache memory, a register file, and a buffer.

The FU 220 is a configuration for processing compiling data, and may include a plurality of input ports, a resource, at least one buffer, an output port, and etc. The description of the FU 220, which overlaps with the features described above with reference to FIGS. 1 and 2, is omitted here. The resource may be a resource for an addition operation, a resource for a multiplication operation, a resource for a subtraction operation, a resource for a division operation, and etc. The resource may be a configuration for performing other various operations.

The FU 220 may be provided for each type of function, and may include only a part of frequently used resources. In addition, the FU 220 may include only different kinds of resources. However, this is only an example, and the FU 220 may include a plurality of the same resources. Each of the resources may be operated independently of each other.

The FU 220 may, when processing a combined instruction included in the compiling data in the first cycle, store data input through at least one of a plurality of input ports in at least one buffer, and calculate the stored data and the data input through one of a plurality of input ports in the second cycle after the first cycle based on the corresponding instruction. That is, a scheduler may schedule to input a plurality of data which was input to one cycle through a plurality of cycles, and when the cycle is changed, schedule to store some of data in at least one buffer. In addition, the FU 220 may calculate the data stored in at least one buffer and the data input from a new cycle based on the corresponding instruction.

FIG. 4 illustrates a method for using an unassigned input port of an FU according to an embodiment of the present disclosure.

Referring to the upper portion of FIG. 4, the FU includes a first input port 10-1, a second input port 10-2, a third input port 10-3, a buffer 20, and an output port 30.

A scheduler may schedule each of a plurality of instructions in a plurality of cycles, and assign a plurality of input data corresponding to each of the plurality of instructions to a plurality of input ports in the corresponding cycle.

For example, the plurality of instructions may include a first multiplication instruction (MUL1), a second multiplication instruction (MUL2), and an addition instruction (ADD), and the scheduler may schedule to calculate the first multiplication instruction (MUL1) in the first cycle, the second multiplication instruction (MUL2) in the second cycle, and the addition instruction (ADD) in the third cycle. In FIG. 4, each cycle is indicated by t for the convenience of explanation, but the present disclosure is not limited thereto.

For example, the scheduler may schedule to input the input data of the first multiplication instruction (MUL1) to the first input port 10-1 of the FU in the first cycle, and input the input data b to the second input port 10-2 of the FU. In addition, the scheduler may schedule to input the input data c of the second multiplication instruction (MUL2) to the first input port 10-1 in the second cycle, and input the input data d to the second input port 10-2. In addition, the scheduler may schedule to input the input data e of the addition instruction (ADD) to the first input port 10-1 in the third cycle, and input the input data f to the second input port 10-2.

However, the present disclosure is not limited to this example of scheduling, and each instruction may have a different number of input data. In addition, the input data of each instruction may be input to the third input port 10-3 of the FU.

The scheduler may, when the same input port between the first cycle and the second cycle after the first cycle is an unassigned input port, assign a part of a plurality of input data corresponding to an instruction scheduled in the second cycle to the unassigned input port in the first cycle, and assign the remaining input data among a plurality of input data corresponding to the instruction to the unassigned input port in the second cycle.

For example, as illustrated in the bottom portion of FIG. 4, the scheduler may, since the third input port 10-3 is in an unassigned state in both the first cycle and the second cycle, schedule to input the input data d of the second multiplication instruction (MUL2) scheduled in the second cycle to the third input port 10-3 of the first cycle, and input the input data c to the third input port 10-3 of the second cycle.

In addition, the scheduler may reschedule an instruction scheduled after the second cycle. Specifically, the scheduler may perform rescheduling based on the number of unassigned input ports in the second cycle. For example, the scheduler may schedule to calculate the addition instruction (ADD), which was scheduled to be calculated in the third cycle, in the second cycle. In addition, the scheduler may schedule to input the input data e of the addition instruction (ADD) to the first input port 10-1 of the second cycle, and input the input data f to the second input port 10-2 of the second cycle.

The FU includes the buffer 20. The FU may store the data input through an unassigned input port in the first cycle in the buffer 20, and calculate the stored data and the data input through one of a plurality of input ports in the second cycle based on the corresponding instruction.

The buffer 20 is a configuration for temporarily storing data, and the buffer 20 may be a capacity capable of storing only one input data. For example, the buffer 20 may store data input through the first input port 10-1, and thereafter, delete the stored data input through the first input port 10-1 to store the data input through the second input port 10-2. That is, the buffer 20 may not simultaneously store a plurality of input data input through a plurality of input ports. In addition, the buffer 20 may not simultaneously store the data sequentially input at time intervals through the same input port, either.

For example, the FU may store the input data d input in the first cycle in the buffer 20, and calculate the input data in the second cycle and the input data d stored in the buffer 20 according to the second multiplication instruction (MUL2).

The scheduler may, when performing rescheduling, perform rescheduling in various methods, and perform rescheduling to obtain an optimal result by reviewing a result according to each method. For example, the scheduler may determine a method a method that minimizes the time taken for outputting the operation results of the plurality of instructions as an optimal result and perform the rescheduling. Specifically, the scheduler may review the results according to each method in consideration of at least one of the dependency and latency between the instructions to be rescheduled.

For example, when the output data of the second multiplication instruction (MUL2) is one of the input data of the addition instruction (ADD), when the output data of the second multiplication instruction (MUL2) is not output until the cycle in which the addition instruction (ADD) is calculated after performing rescheduling according to the first method, the scheduler may not use the rescheduling according to the first method.

Specifically, the scheduler may consider the latency of each instruction in this process. That is, the scheduler may calculate the cycle from which the output data is output according to the latency of the second multiplication instruction (MUL2).

The storage of the electronic apparatus may store information to combine a plurality of instructions into a single instruction. The storage may refer to a storage capable of storing more data than the buffer 20. The storage may be provided in a source external to the external apparatus. In this case, the above-described information may be received from the storage external to the external apparatus, and temporarily received in a cache memory provided within the electronic apparatus to be used for rescheduling.

The scheduler may change an instruction scheduled in the first cycle and an instruction scheduled in the second cycle based on the information stored in the storage, and reschedule the combined instruction in the first cycle. That is, while two cycles were required to issue two instructions, the two instructions may be issued during one cycle using the combined instruction. A method for using a combined instruction will be described in more detail later below.

Although FIG. 4 has been described above where the same input port is unassigned, the present disclosure is not limited to this example. For example, the above-described operation may be performed also when the third input port 10-3 of the first cycle, the second input port 10-2, and the third input port 10-3 of the second cycle are in an unassigned state. The scheduler 120 may reschedule the instruction having the number of input data as many as the number of currently unassigned input ports among the instructions in the second cycle or after the second cycle. The scheduling method may be the same as described above.

FIG. 5 illustrates a method for using an unassigned input port of an FU according to an embodiment of the present disclosure.

Referring to the upper portion of FIG. 5, the scheduler may schedule four instructions over four cycles. The description of FIG. 5 that overlaps with the description above of FIG. 4 will be omitted here.

The scheduler may, when an unassigned input port among a plurality of input ports 10-1, 10-2, and 10-3 is present in the first cycle, assign a part of a plurality of input data corresponding to an instruction scheduled in the second cycle after the first cycle, and the remaining part of the plurality of input data corresponding to the instruction to one of the plurality of input ports 10-1, 10-2, and 10-3 in the second cycle. That is, the scheduler may reschedule the scheduled instructions in subsequent cycles other than the cycle immediately after the first cycle in which the unassigned input port is present.

The scheduler may not reassign the second multiplication instruction (MUL2) because the number of input data of the second multiplication instruction (MUL2) scheduled in the second cycle is three and an unassigned input port is not present in the second cycle.

The scheduler may reschedule the instruction subsequent to the third multiplication instruction (MUL3) because the number of input data of the third multiplication instruction (MUL3) scheduled in the third cycle is two and an unassigned input port is present in the third cycle.

For example, the scheduler may schedule to input the input data g of the third multiplication instruction (MUL3) to the third input port 10-3 of the first cycle and input the input data f to the third input port 10-3 of the third cycle.

In addition, the scheduler may schedule to input the input data h and i of the addition instruction (ADD) to the first input port 10-1 and second input port 10-2 of the third cycle, respectively.

However, the present disclosure is not limited to this example, and the scheduler may reschedule an instruction subsequent to the addition instruction (ADD), not the third multiplication instruction (MUL3), in consideration of at least one of the dependency and latency between the instructions.

The FU may store the data input through an unassigned input port in the first cycle in a buffer 20, and calculate the stored data and the data input through one of a plurality of input ports in the third cycle based on the corresponding instruction.

For example, as illustrated in the lower portion of FIG. 5, the FU may store the input data g input in the first cycle in the buffer 20, and calculate the input data f in the third cycle and the input data g stored in the buffer 20 according to the third multiplication instruction (MUL2).

In addition, as illustrated in FIG. 4, the scheduler may change a plurality of instructions to a combined instruction to perform scheduling.

FIG. 6 illustrates a method for using an unassigned input port of an FU according to an embodiment of the present disclosure.

Referring to the upper portion of FIG. 6, the scheduler may schedule (n+1) instructions over (n+1) cycles. As the detailed description thereof is the same as that of FIG. 4, further description will not be provided for simplicity.

When an unassigned input port is present in the two consecutive cycles, the scheduler may reschedule the instructions in the subsequent cycles other than the instructions scheduled in the two consecutive cycles.

For example, when the third input port 10-3 of the first cycle and the second cycle is in an unassigned state, the scheduler may reschedule the eighth multiplication instruction (MUL8) scheduled in the subsequent n-th cycle other than the first multiplication instruction (MUL1) or the second multiplication instruction (MUL2).

The scheduler may schedule to input the input data s of the eighth multiplication instruction (MUL8) to the third input port 10-3 of the first cycle and input the input data r to the third input port 10-3 of the third cycle. The input order of the input data s and the input data r may be changed. When an unassigned input port is present in two consecutive cycles, the scheduler may reschedule the instruction scheduled in a completely different cycle.

The scheduler may reschedule the instruction to determine whether the calculation of the other dependent instruction is delayed. In addition, the scheduler may reschedule the instruction to determine whether there are a plurality of output data which is output through the output port 30 during one cycle. In FIG. 6, the FU includes only one output port 30, and therefore, may output only one output data during one cycle. Accordingly, the scheduler may perform rescheduling when it is determined that a plurality of output data is output during one cycle.

The unassigned input port of each cycle may be the same input port, but the present disclosure is not limited to this example. For example, the unassigned input port of each cycle may be different input ports, and the number of unassigned input ports of each cycle may also be different.

The FU may store the data input through an unassigned input port in the first cycle in the buffer 20, and calculate the stored data and the data input through one of a plurality of input ports in the second cycle based on the corresponding instruction.

For example, as illustrated in the lower portion of FIG. 6, the FU may store the input data s input in the first cycle in the buffer 20, and calculate the input data r in the second cycle and the input data s stored in the buffer 20 according to the eighth multiplication instruction (MULE).

In addition, as illustrated in FIG. 4, the scheduler may change a plurality of instructions to a combined instruction to perform scheduling.

FIG. 6 illustrates secondary scheduling when there is an unassigned input port after completion of primary scheduling for a plurality of instructions.

For example, as illustrated in the upper drawing of FIG. 6, the scheduler may complete primary scheduling from the first multiplication instruction (MUL1) of the first cycle to the fifth addition instruction (ADD5) of the (n+1)th cycle and then, perform secondary scheduling to assign the input data to the unassigned input port of the first cycle.

However, the present disclosure is not limited to this example, and the scheduler may, when there is an unassigned input port in the process of primary scheduling with respect to the plurality of instructions, simultaneously perform secondary scheduling.

For example, the scheduler may, before scheduling another instruction after scheduling the first multiplication instruction (MUL1) in the first cycle, because the third input port 10-3 of the first cycle is in an unassigned state, assign a part of the input data of one of the another instructions to the third input port 10-3 of the first cycle and assign the remaining input data to the third input port 10-3 of the second cycle.

In FIG. 6, although the eighth multiplication instruction (MULE) is reassigned, the present disclosure is not limited thereto. For example, the scheduler may reschedule the second addition instruction (ADD2) of the fourth cycle. In this case, as described above, the scheduler may determine an instruction to be rescheduled in consideration of at least one of the dependency and latency between the instructions.

In FIG. 6, although one instruction is rescheduled in the state in which the third input port 10-3 of the first cycle is unassigned, the present disclosure is not limited thereto. When there is unassigned input port in another cycle, another instruction may also be rescheduled. Accordingly, not only one cycle is saved as illustrated in FIG. 6, but it is possible to save multiple cycles.

FIG. 7 illustrates a combined instruction according to an embodiment of the present disclosure.

Referring to FIG. 7, a storage may store information to combine a plurality of instructions into a single instruction. For example, the storage may store information on a combined instruction (DMUL), which is an instruction obtained by combining two multiplication instructions (MUL), a combined instruction (MUL_ADD, ADD_MUL), which is an instruction obtained by combining the multiplication instruction (MUL) and the addition instruction (ADD), etc.

When two different types of instructions are combined, the combined instruction may be divided into two types according to the instruction using a buffer. For example, when the multiplication instruction (MUL) and the addition instruction (ADD) are combined, the addition instruction (ADD) may use the buffer in the combined instruction (MUL_ADD) and the multiplication instruction (MUL) may use the buffer in the combined instruction (ADD_MUL).

The storage may store the information on the combined instruction obtained by combining the same type of instructions and also the information on the combined instructions obtained by combining different types of instructions. The storage may store a plurality of instructions including at least one arithmetic operation instruction, and store information on the combined instructions of the plurality of instructions. However, the present disclosure is not limited thereto, and the storage may store other various types of instructions, and store information on the combined instruction between each of the instructions.

The scheduler may change an instruction scheduled in the first cycle and an instruction scheduled in the second cycle based on the information stored in the storage, and reschedule the combined instruction in the first cycle. Specifically, the scheduler may, even when the type of the instruction scheduled in the first cycle is different from the type of the instruction scheduled in the second cycle, change the instructions to a combined instruction to perform scheduling.

The instruction scheduled in the second cycle may be combinable with the instruction scheduled in the first cycle. For example, a plurality of input instructions may include an addition instruction, a subtraction instruction, and a multiplication instruction. When only the information on the combined instruction between the addition instruction and the subtraction instruction is stored in the storage, the scheduler may change the addition instruction and the subtraction instruction to the combined instruction to perform scheduling. However, as described above, the scheduler may additionally consider at least one of the number of input data of a plurality of instructions to be changed to the combined instruction, the number of buffers, the latency of each instruction, and the dependency of the plurality of input instructions.

The combined instruction may include at least one of information on an execution cycle of each of the instruction scheduled in the first cycle and the instruction scheduled in the second cycle and information on an input port and input cycle of the input data corresponding to the instruction scheduled in the first cycle and the instruction scheduled in the second cycle.

For example, when the combined instruction obtained by combining the first instruction with the second instruction is issued in the first cycle, the combined instruction may store information to calculate a plurality of input data input in the first cycle through a first input port and a second input port in the first cycle according to the first instruction. In addition, the combined instruction may store information to calculate input data received in the first cycle through a third input port and stored in the buffer and input data input in the second cycle through the third input port in the second cycle according to the second instruction.

Figure 8:
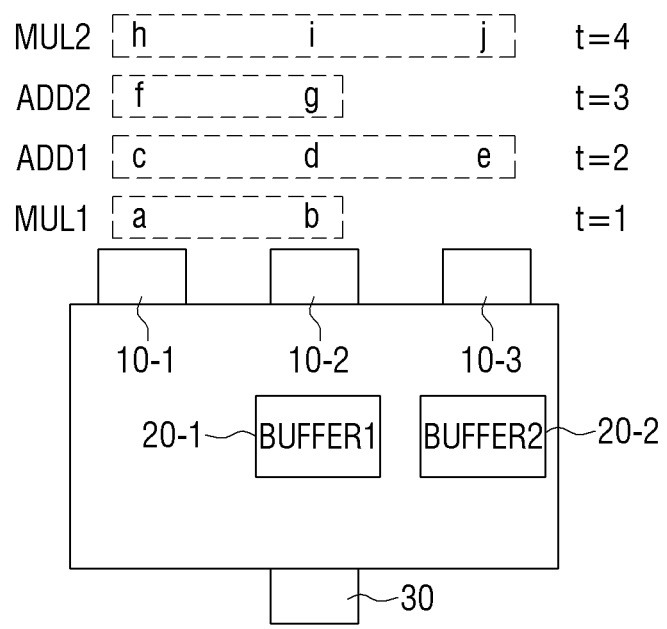
FIG. 8 illustrates a method for using an unassigned input port of an FU including a plurality of buffers, according to an embodiment of the present disclosure.

FIG. 8 illustrates a method for using an unassigned input port of an FU including a plurality of buffers, according to an embodiment of the present disclosure.

Referring to FIG. 8, different from FIGS. 4-6, the FU includes a plurality of buffers 20-1 and 20-2. The scheduler may reschedule instructions corresponding to the input data as many as the sum of the number of unassigned input ports and the number of at least one buffer.

For example, when primary scheduling is performed as illustrated in FIG. 8, the scheduler may, when the third input port 10-3 of the first cycle is in an unassigned state, since the number of unassigned input ports is one and the number of buffers 20-1 and 20-2 is two, reschedule the first addition instruction (ADD1) or the second multiplication instruction (MUL2) of which the number of input data is three.

The scheduler may examine whether a combined instruction can be obtained and reschedule the first addition instruction (ADD1) or the second multiplication instruction (MUL2). In addition, the scheduler may also reschedule the first addition instruction (ADD1) or the second multiplication instruction (MUL2) in consideration of at least one of the dependency and latency between the instructions.

As another example, the scheduler may reschedule an instruction corresponding to the input data of which the number is less than or equal to the sum of the number of unassigned input ports and the number of at least one buffer. For example, the scheduler may reschedule an instruction of which the number of input data is less than or equal to three. That is, the scheduler may reschedule the second addition instruction (ADD2) and the first addition instruction (ADD1) or the second multiplication instruction (MUL2).

FIG. 9 illustrates a combined instruction being used, according to an embodiment of the present disclosure. In describing FIG. 9, it is assumed that an FU includes only one output port 30. Accordingly, the FU may only output one output data during one cycle. However, the present disclosure is not limited to this example, and a plurality of output ports may be provided.

The FU may include a plurality of input ports, and when scheduling is performed in error, a plurality of output data may be output during one cycle, such that a conflict occurs. Accordingly, the scheduler may perform scheduling in consideration of the number of output ports and the latency of each instruction.

In FIG. 9, the latency of each of the multiplication operation, the addition operation, and the subtraction operation are 5, 2, and 2 cycles, respectively. For example, when the multiplication operation is issued in the first cycle, it may be written back in the sixth cycle. Different latencies may occur according to a hardware configuration.

Referring to FIG. 9, the upper portion illustrates scheduling prior to using a combined instruction. A total of 14 cycles are required under the condition that one instruction is issued during one cycle and only one output data is output during one cycle.

However, in the lower portion of FIG. 9, the same operation may be performed during only 11 cycles by using the combined instruction (DMUL) obtained by combining two multiplication instructions twice.

The output data using one instruction may be input to a particular address of a particular register, and a code rule therefor may be predetermined. However, when a combined instruction is used, the number of output data is two, and the existing code rule is configured to refer to only a particular address of a particular register in which one output data is to be stored. Accordingly, hardware may be configured such that the first output data using the combined instruction is stored in a particular address of a particular register set by the same code rule, and that the second output data is stored in the very next address of the particular address of the particular register. Through the operation described above, there is no need to write code for each instruction, and the code size can be reduced.

Figure 10:
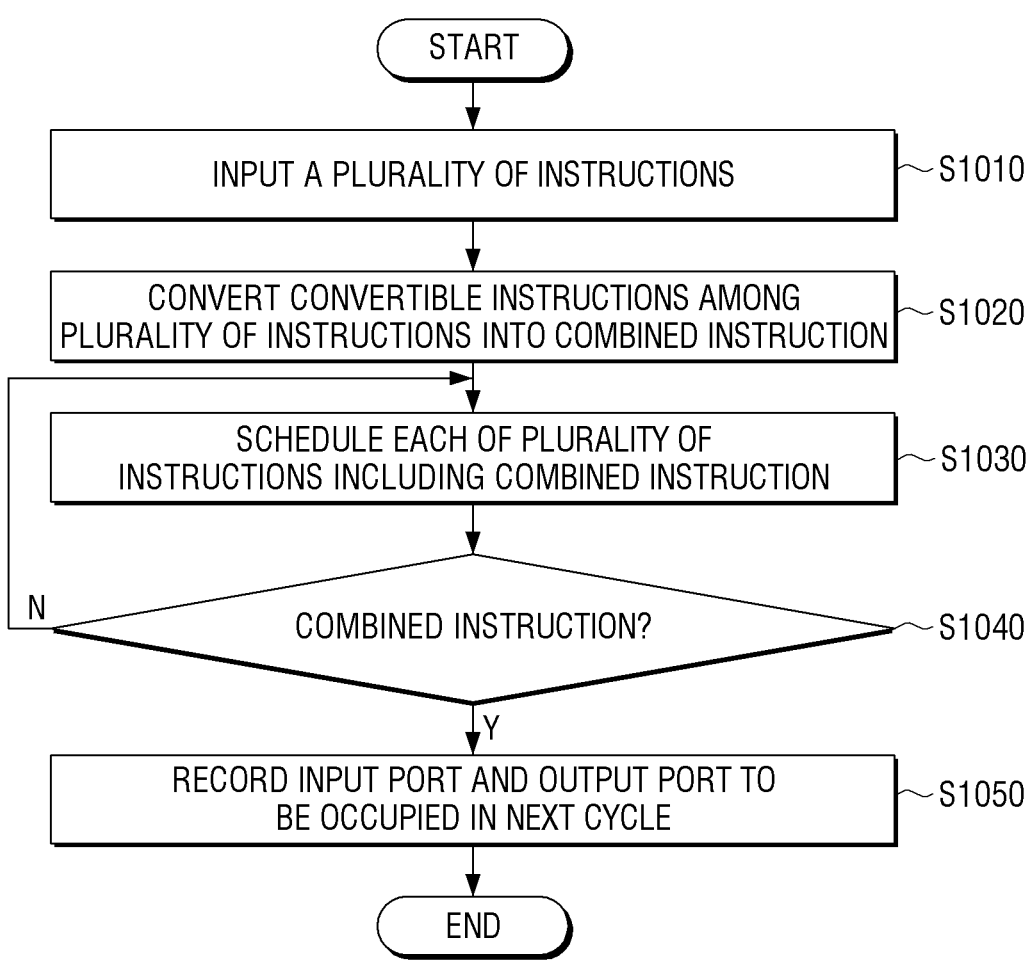
FIG. 10 is a flowchart illustrating a method for using a combined instruction according to an embodiment of the present disclosure.

FIG. 10 is a flowchart illustrating a method for using a combined instruction according to an embodiment of the present disclosure.

Referring to FIG. 10, a plurality of instructions are input to an electronic apparatus in step S1010. The plurality of instructions may be dependent on each other.

In step S1020, a scheduler converts convertible instructions among the plurality of instructions into a combined instruction. The scheduler may use information on the combined instruction which represents whether the plurality of instructions are combined.

In step S1030, the scheduler schedules each of the plurality of instructions including a combined instruction. Although it is described that a combined instruction is obtained first, the present disclosure is not limited thereto. For example, the scheduler may schedule a plurality of instructions before obtaining a combined instruction, and then generate a combined instruction when an unassigned input port is present.

In step S1040, the scheduler determined if a combined instruction is scheduled in the scheduling process.

If the combined instruction is scheduled in the scheduling process in step S1040, the scheduler records an input port and output port to be occupied in the next cycle in step S1050. The scheduler may perform scheduling according to a related-art method when a normal instruction is scheduled in the scheduling process.

However, if the combined instruction is not scheduled in the scheduling process in step S1040, the scheduler schedules each of the plurality of instructions including a combined instruction in step S1030.

Figure 11A:
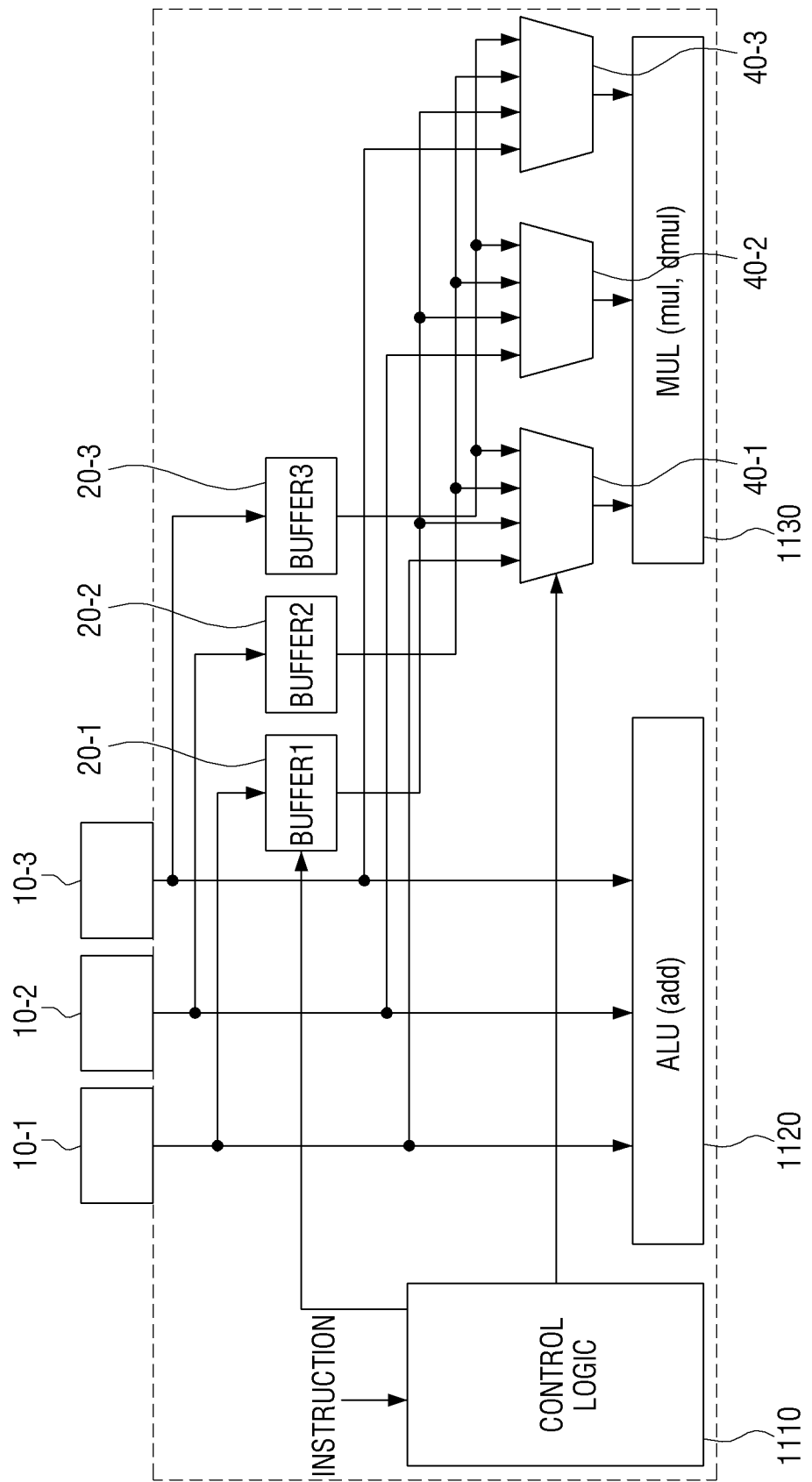
FIGS. 11A to 11C illustrate an internal structure of an FU according to various embodiments of the present disclosure.
Figure 11B:
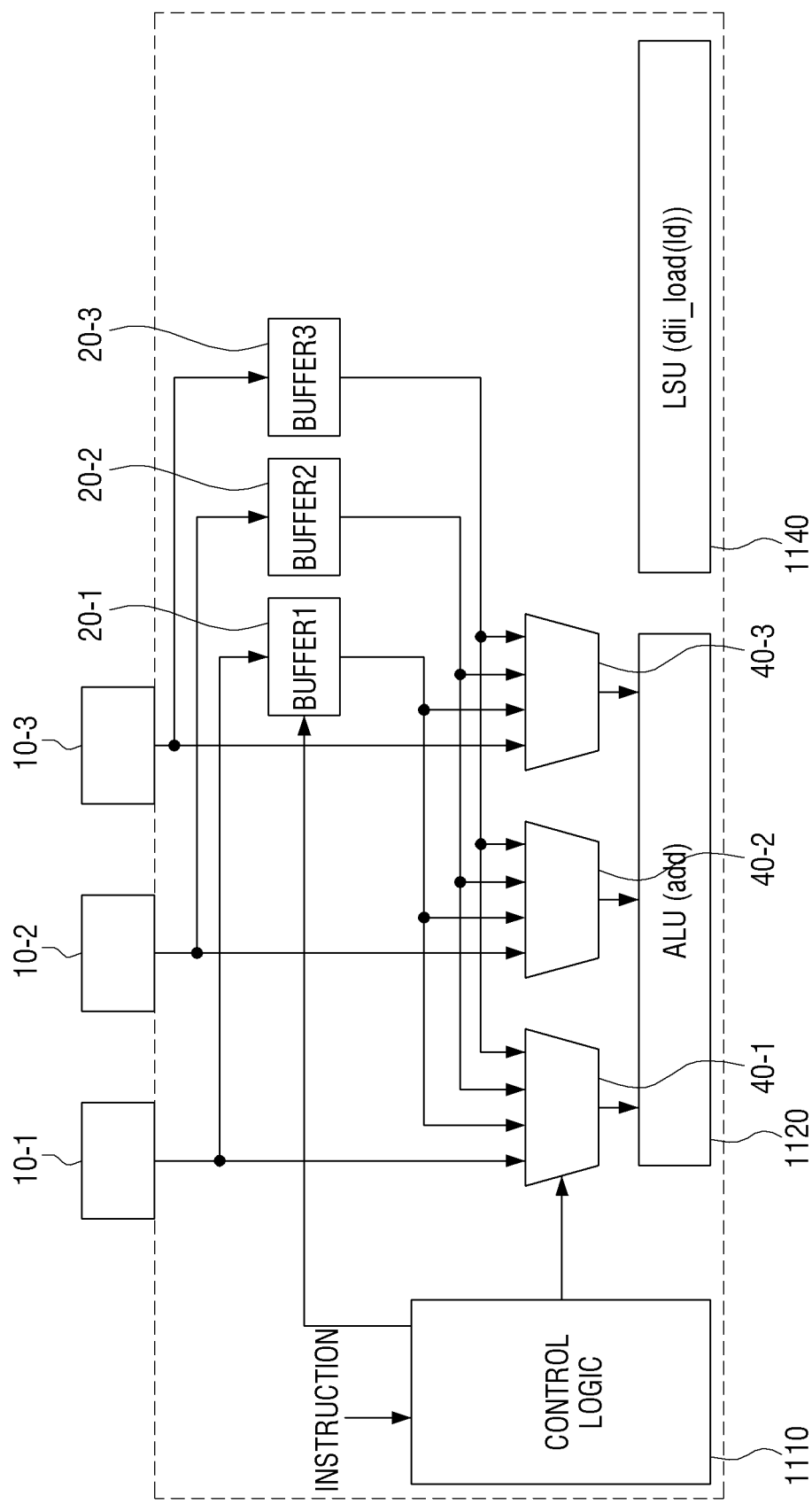
Figure 11C:
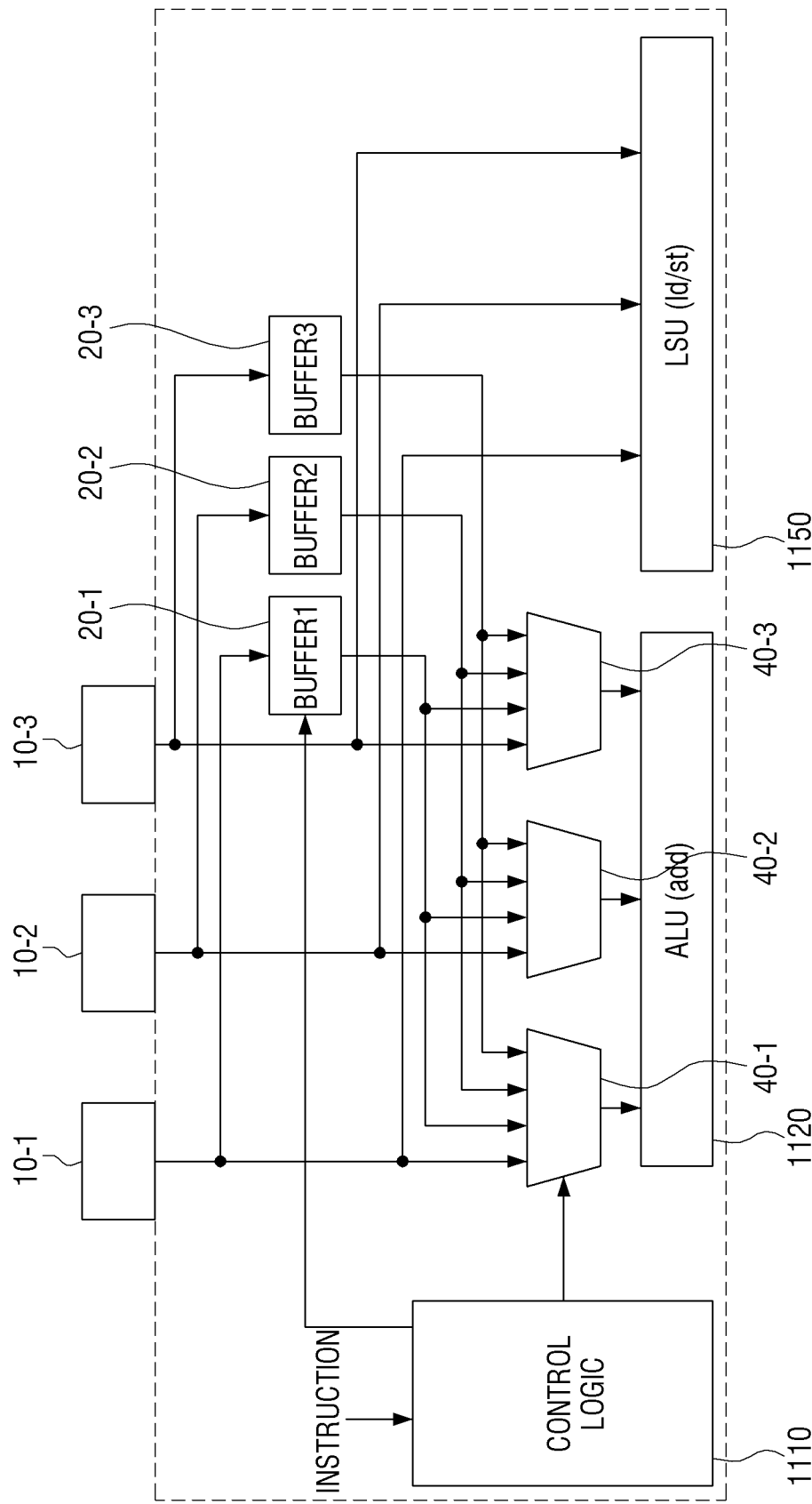

FIGS. 11A to 11C illustrate an internal structure of an FU according to various embodiments of the present disclosure.

Referring to FIG. 11A, the FU includes a control logic 1110, an arithmetic logic unit (ALU) 1120, an MUL 1130, input ports 10-1, 10-2, and 10-3, buffers 20-1, 20-2, and 20-3, and multiplexors (MUXs) 40-1, 40-2, and 40-3. The ALU 1120 and the MUL 1130 are commonly known, and the input ports 10-1, 10-2, and 10-3 are the same as described above. Thus, detailed descriptions of these elements will be omitted herein.

The control logic 1110 may receive an instruction from an external source external to control the buffers 20-1, 20-2, and 20-3 and the MUXs 40-1, 40-2, and 40-3 within the FU. Specifically, the control logic 1110 may interpret the instruction to control whether data of each buffer is stored and output, and determine output data of each MUX.

For example, when a combined instruction is input as in the lower portion of FIG. 4, the control logic 1110 may control the MUXs 40-1, 40-2, and 40-3 to calculate the input data a and the input data b input through each of the first input port 10-1 and the second input port 10-2 in the first cycle. Specifically, the control logic 1110 may control the output data of the MUX 1 40-1 and the MUX 2 40-2 to be the input data a and the input data b input through each of the first input port 10-1 and the second input port 10-2. In this case, the buffer 1 20-1 and the buffer 2 20-2 need not store data, and the control logic 1110 may control the buffer 1 20-1 and the buffer 20-2 not to store the data.

In addition, the control logic 1110 may control the buffer 3 20-3 to store the input data d of the second multiplication instruction (MUL2) input through the third input port 10-3 in the first cycle if the DMUL instruction is input in the buffer 3 20-3.

The control logic 1110 may control the buffer 3 20-3 and the MUXs 40-1, 40-2, and 40-3 such that the input data c of the second multiplication instruction (MUL2) input in the second cycle through the third port 10-3 and the input data d stored in the buffer 3 20-3 are input to the MUL 1130.

For example, the control logic 1110 may control such that the input data c is output by the MUX3 40-3 in the second cycle, and that the input data d is output by the MUX 1 40-1 or the MUX 2 40-2.

FIG. 11B illustrates an FU according to an embodiment of the present disclosure.

Referring to FIG. 11B, the FU includes a control logic 1110, an ALU 1120, a load-store unit (LSU) (dii_load(ld)) 1140, input ports 10-1, 10-2, and 10-3, buffers 20-1, 20-2, and 20-3, and MUXs 40-1, 40-2, and 40-3. The detailed description of the elements of the FU in FIG. 11B, which overlap with those of FIG. 11A, will be omitted herein.

In FIG. 11B, the buffers 20-1, 20-2, and 20-3 and the MUXs 40-1, 40-2, and 40-3 are connected to the ALU 1120. The control logic 1110 may, as illustrated in FIG. 11A, control the plurality of buffers 20-1, 20-2 and 20-3 and the plurality of MUXs 40-1, 40-2 and 40-3 to control to operate the ALU 1120 of FIG. 11B as the MUL 1130 of FIG. 11A.

The LSU(dii_load(ld)) 1140 may directly receive data from an external source. For example, the LSU(dii_load(ld)) 1140 may directly receive data from an external memory. Accordingly, connection with the input port, buffer, or the MUX may be unnecessary.

FIG. 11C illustrates an FU according to an embodiment of the present disclosure. Specifically, in FIG. 11C the LSU (dii_load(ld)) 1140 of FIG. 11B is changed to the LSU(ld/st) 1150. The LSU(ld/st) 1150 differs from the LSU(dii_load (ld)) 1140 in that data may be received from input ports 10-1, 10-2, and 10-3. The other operations of the LSU(ld/st) 1150 are identical to the operation of the LSU(dii_load(ld)) 1140 in FIG. 11B.

Although FIGS. 11A to 11C illustrate that the control logic 1110 is connected to the buffer 1 20-1 and the MUX 1 40-1, this is only for simplicity ease of explanation, and the control logic 1110 may be connected to all of the buffers 20-1, 20-2, and 20-3 and the MUXs 40-1, 40-2, and 40-3 to control each of them.

FIG. 12 is a flowchart illustrating a control method of an electronic apparatus according to an embodiment of the present disclosure.

Referring to FIG. 12, in step S1210, at least one input data is assigned to a plurality of input ports based on an instruction scheduled in the first cycle.

In step S1220, when an unassigned input port among a plurality of input ports is present in the first cycle, a part of a plurality of input data corresponding to the instruction scheduled in the second cycle after the first cycle is assigned to the unassigned input port in the first cycle, and the remaining data among the plurality of input data corresponding to the instruction may be assigned to one of the plurality of input ports in the second cycle to generate compiling data.

Obtaining the compiling data by assigning data to one of a plurality of input ports may include, when the same input port between the first cycle and the second cycle after the first cycle is an unassigned input port, assigning a part of a plurality of input data corresponding to an instruction scheduled in the second cycle to the unassigned input port in the first cycle, and assigning the remaining input data among a plurality of input data corresponding to the instruction to the unassigned input port in the second cycle.

In addition, obtaining the compiling data may further include changing an instruction scheduled in the first cycle and an instruction scheduled in the second cycle based on information for combining a plurality of instructions into a single instruction, and rescheduling the combined instruction in the first cycle.

The instruction scheduled in the second cycle may be an instruction which is combinable with the instruction scheduled in the first cycle.

In addition, the plurality of instructions may include at least one arithmetic operation instruction, and the type of the instruction scheduled in the first cycle may be different from that of the instruction scheduled in the second cycle.

Obtaining the compiling data by assigning data to one of a plurality of input ports may include determining an instruction corresponding to input data as many as the sum of the number of unassigned input ports and the number of at least one buffer as an instruction scheduled in the second cycle.

The combined instruction may include at least one of information on an execution cycle of each of the instruction scheduled in the first cycle and the instruction scheduled in the second cycle and information on an input port and input cycle of the input data corresponding to the instruction scheduled in the first cycle and the instruction scheduled in the second cycle.

In addition, based on the latency of each of the plurality of instructions, obtaining the compiling data may further include scheduling such that the output data corresponding to the instruction scheduled in the first cycle and the output data corresponding to the instruction scheduled in the second cycle are not simultaneously output through the output port of the FU.

Figure 13:
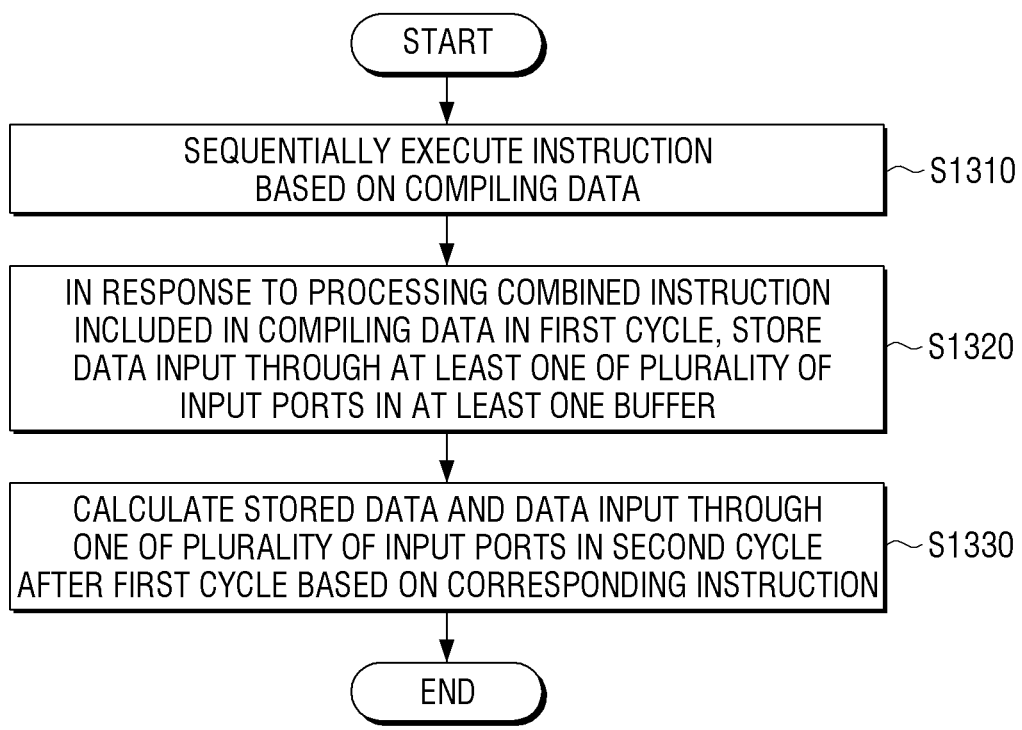
FIG. 13 is a flowchart illustrating a control method of a processor according to an embodiment of the present disclosure.

FIG. 13 is a flowchart illustrating a control method of a processor according to an embodiment of the present disclosure.

Referring to FIG. 13, in step S1310, an instruction is sequentially executed based on the compiling data.

In step S1320, when the combined instruction included in the compiling data is processed in the first cycle, data input through at least one of a plurality of input ports may be stored in at least one buffer.

In step S1330, the stored data and the data input in the second cycle after the first cycle through one of the plurality of input ports are calculated based on the corresponding instruction.

According to the above-described various embodiments, an electronic apparatus may schedule an instruction to use an unassigned input port of an FU to improve scheduling efficiency and reduce cord size.

Although it is described above that a plurality of input data is received to perform different operations according to the corresponding instruction, the present disclosure is not limited to this example. For example, when there is no input data or if there is only one input data, the same method may be employed to save the cycle.

Methods according to various embodiments may be programmed and stored in various storage media. Accordingly, the methods according to the above-described embodiments may be realized in various types of electronic apparatuses to execute a storage medium.

Specifically, a non-transitory computer-readable medium in which a program is stored for sequentially performing the above-described scheduling method may be provided.

A non-transitory computer readable medium refers to a medium that stores data semi-permanently rather than storing data for a very short time, such as a register, a cache, a memory, etc., and is readable by an apparatus. The above-described various applications or programs may be stored in the non-transitory computer readable medium, e.g., a compact disc (CD), a digital versatile disc (DVD), a hard disc, a Blu-ray disc, a universal serial bus (USB), a memory card, a read only memory (ROM), etc., and may be provided.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic apparatus for obtaining compiling data that is used in an external processor including a function unit (FU) including a plurality of input ports, the apparatus comprising:
    a storage; and
    a processor including a compiler configured to:
    control, by the compiler, the storage to store a plurality of instructions,
    obtain, by the compiler, the compiling data by scheduling each of the plurality of instructions in a corresponding cycle of a plurality of cycles, by assigning a plurality of input data corresponding to each of the plurality of instructions to the plurality of input ports in a corresponding cycle of the plurality of cycles, and
    in response to determining, by the compiler, an unassigned input port among the plurality of input ports is present in a first cycle, update the compiling data by assigning a part of input data corresponding to an instruction scheduled in a second cycle after the first cycle to the unassigned input port in the first cycle, and by assigning remaining data of the input data corresponding to the instruction scheduled in the second cycle after the first cycle to one of the plurality of input ports in the second cycle.

2. The apparatus as claimed in claim 1, wherein the processor is further configured to, if a same input port is the unassigned input port in the first cycle and the second cycle after the first cycle, assign a part of the input data corresponding to the instruction scheduled in the second cycle to the unassigned input port in the first cycle, and assign the remaining data of the input data corresponding to the instruction to the unassigned input port in the second cycle.

3. The apparatus as claimed in claim 1, wherein the processor is further configured to:
    obtain a single combined instruction by combining an instruction scheduled in the first cycle and the instruction scheduled in the second cycle, and
    reschedule the single combined instruction in the first cycle.

4. The apparatus as claimed in claim 3, wherein the instruction scheduled in the second cycle is combinable with the instruction scheduled in the first cycle.

5. The apparatus as claimed in claim 3, wherein the plurality of instructions include at least one arithmetic operation instruction, and
    wherein a type of the instruction scheduled in the first cycle and a type of the instruction scheduled in the second cycle are different from each other.

6. The apparatus as claimed in claim 3, wherein the single combined instruction includes at least one of:
    information on an execution cycle of each of the instruction scheduled in the first cycle and the instruction scheduled in the second cycle; and
    information on an input port and input cycle of input data corresponding to each of an instruction scheduled in the first cycle and the instruction scheduled in the second cycle.

7. The apparatus as claimed in claim 1, wherein the processor is further configured to determine an instruction corresponding to input data based on a sum of a number of the unassigned input ports and a number of at least one buffer as the instruction scheduled in the second cycle.

8. The apparatus as claimed in claim 1, wherein the FU further includes an output port, and
    wherein the processor is further configured to, based on a latency of each of the plurality of instructions, schedule not to simultaneously output output data corresponding to an instruction scheduled in the first cycle and output data corresponding to the instruction scheduled in the second cycle through the output port.

9. A control method of an electronic apparatus for obtaining compiling data that is used in an external processor including a function unit (FU) including a plurality of input ports, the control method comprising:
    obtaining, by a compiler, the compiling data by assigning input data to the plurality of input ports based on an instruction scheduled in a first cycle from among a plurality of instructions; and
    in response to determining, by the compiler, an unassigned input port among the plurality of input ports is present in the first cycle, updating the compiling data by assigning a part of the input data corresponding to an instruction scheduled in a second cycle after the first cycle from among the plurality of instructions to the unassigned input port in the first cycle, and by assigning remaining data of the input data corresponding to the instruction scheduled in the second cycle to one of the plurality of input ports in the second cycle.

10. The control method as claimed in claim 9, wherein updating the compiling data comprises, if a same input port is the unassigned input port in the first cycle and the second cycle after the first cycle, assigning the part of the input data corresponding to the instruction scheduled in the second cycle to the unassigned input port in the first cycle, and assigning the remaining data of the input data corresponding to the instruction to the unassigned input port in the second cycle.

11. The control method as claimed in claim 9, further comprising:
    obtaining a single combined instruction by combining the instruction scheduled in the first cycle and the instruction scheduled in the second cycle; and
    rescheduling the single combined instruction to the first cycle.

12. The control method as claimed in claim 11, wherein the instruction scheduled in the second cycle is combinable with the instruction scheduled in the first cycle.

13. The control method as claimed in claim 11, wherein the plurality of instructions include at least one arithmetic operation instruction, and
    wherein a type of the instruction scheduled in the first cycle and a type of the instruction scheduled in the second cycle are different from each other.

14. The control method as claimed in claim 11, wherein the single combined instruction includes at least one of:
    information on an execution cycle of each of the instruction scheduled in the first cycle and the instruction scheduled in the second cycle; and
    information on an input port and input cycle of input data corresponding to the instruction scheduled in the first cycle and the instruction scheduled in the second cycle.

15. The control method as claimed in claim 9, wherein updating the compiling data comprises determining an instruction corresponding to input data based on a sum of a number of the unassigned input ports and a number of at least one buffer as the instruction scheduled in the second cycle.

16. The control method as claimed in claim 9, further comprising, based on a latency of each of the plurality of instructions, scheduling not to simultaneously output output data corresponding to the instruction scheduled in the first cycle and output data corresponding to the instruction scheduled in the second cycle through an output port of the FU.

* * * * *